United States Patent [19]

Nelson et al.

[11] Patent Number: 5,118,327
[45] Date of Patent: Jun. 2, 1992

[54] DEHUMIDIFIER FOR SUPPLYING GAS HAVING CONTROLLED DEW POINT

[75] Inventors: Donald A. Nelson, Allen; David C. Thornton, Grapevine, both of Tex.

[73] Assignee: Andrew Corporation, Orland Park, Ill.

[21] Appl. No.: 417,746

[22] Filed: Oct. 5, 1989

[51] Int. Cl.⁵ ............................................. B01D 53/22
[52] U.S. Cl. ........................................... 55/16; 55/18; 55/21; 55/158
[58] Field of Search ............... 55/16, 18, 20, 21, 68, 55/158

[56] References Cited

U.S. PATENT DOCUMENTS

| | | | |
|---|---|---|---|
| 3,133,132 | 5/1964 | Loeb et al. | 264/49 |
| 3,499,062 | 3/1970 | Geary et al. | 264/36 |
| 3,511,031 | 5/1970 | Ketteringham et al. | 55/158 |
| 3,536,611 | 10/1970 | DeFilippi et al. | 210/22 |
| 3,556,305 | 1/1971 | Schorr | 210/490 |
| 3,556,992 | 1/1971 | Massucco | 210/23 |
| 3,580,841 | 5/1971 | Cadotte et al. | 210/23 |
| 3,615,024 | 10/1971 | Michaels | 210/490 |
| 3,616,607 | 11/1971 | Klass et al. | 55/16 |
| 3,657,113 | 4/1972 | Stancell et al. | 210/23 |
| 3,676,203 | 7/1972 | Sachs et al. | 117/123 D |
| 3,735,558 | 5/1973 | Skarstrom et al. | 55/158 X |
| 3,735,559 | 5/1973 | Salemme | 55/158 X |
| 3,775,303 | 11/1973 | McKinney et al. | 208/210 |
| 3,775,308 | 11/1973 | Yasuda | 210/23 |
| 3,874,986 | 4/1975 | Browall et al. | 161/160 |
| 3,892,665 | 7/1975 | Steigelmann et al. | 210/490 |
| 3,899,309 | 8/1975 | Hoehn et al. | 210/500 |
| 3,926,798 | 12/1975 | Cadotte | 210/23 |
| 3,980,456 | 9/1976 | Browall | 250/500 |
| 4,108,765 | 8/1978 | Lee | 210/23 |
| 4,142,966 | 3/1979 | Perry | 210/22 |
| 4,157,960 | 6/1979 | Chang et al. | 210/23 |
| 4,218,312 | 8/1980 | Perry | 210/22 |
| 4,230,463 | 10/1980 | Henis et al. | 210/500 |
| 4,311,594 | 1/1982 | Perry | 210/640 |
| 4,397,661 | 8/1983 | King et al. | 55/158 |
| 4,421,529 | 12/1983 | Revak et al. | 55/21 X |
| 4,472,175 | 9/1984 | Malon et al. | 55/16 |
| 4,486,202 | 12/1984 | Malon et al. | 55/158 |
| 4,497,640 | 2/1985 | Fournie et al. | 55/16 |
| 4,575,385 | 3/1986 | Brooks et al. | 55/158 |
| 4,583,996 | 4/1986 | Sakata et al. | 55/16 |
| 4,597,777 | 7/1986 | Graham | 55/16 |
| 4,614,524 | 9/1986 | Kraus | 55/16 |
| 4,654,055 | 3/1987 | Malon et al. | 55/158 |
| 4,687,578 | 8/1987 | Stookey | 210/321 |
| 4,710,204 | 12/1987 | Kraus et al. | 55/16 |
| 4,728,345 | 3/1988 | Murphy | 55/158 |
| 4,783,201 | 11/1988 | Rice et al. | 55/16 |
| 4,806,132 | 2/1989 | Campbell | 55/16 |
| 4,844,719 | 7/1989 | Toyomoto et al. | 55/16 |
| 4,857,082 | 8/1989 | DiMartino, Sr. et al. | 55/21 X |
| 4,863,492 | 9/1989 | Dashi et al. | 55/21 X |

FOREIGN PATENT DOCUMENTS

| | | | |
|---|---|---|---|
| 00514694 | 5/1982 | European Pat. Off. | 55/16 |
| 54-015349 | 2/1979 | Japan | 55/158 |
| 60-238119 | 11/1985 | Japan | 55/158 |
| 62-042723 | 2/1987 | Japan | 55/16 |
| 62-049929 | 3/1987 | Japan | 55/158 |
| 62-191404 | 8/1987 | Japan | 55/158 |
| 62-273028 | 11/1987 | Japan | 55/158 |
| 63-111923 | 5/1988 | Japan | 55/158 |
| 63-123421 | 5/1988 | Japan | 55/158 |
| 63-123422 | 5/1988 | Japan | 55/158 |
| 63-137729 | 6/1988 | Japan | 55/16 |
| 63-236517 | 10/1988 | Japan | 55/16 |
| 63-296819 | 12/1988 | Japan | 55/16 |
| 1271552 | 11/1986 | U.S.S.R. | 55/21 |

Primary Examiner—Robert Spitzer
Attorney, Agent, or Firm—Arnold, White & Durkee

[57] ABSTRACT

A dehumidifying system uses a membrane cartridge to filter water vapor from air introduced into the membrane cartridge via a compressor. The pressure of the air supplied to the membrane cartridge is regulated so that the flow rate through the membrane cartridge can be easily controlled by a flow-control valve or orifice connected to the outlet of the membrane cartridge. The flow rate is controlled so the air remains within the membrane cartridge long enough to produce dehumidified air having a preselected maximum dew point.

14 Claims, 1 Drawing Sheet

DEHUMIDIFIER FOR SUPPLYING GAS HAVING CONTROLLED DEW POINT

BACKGROUND OF THE INVENTION

1. Field of the Invention

This invention relates generally to dehumidifying systems, and more particularly to a dehumidifying system that uses a membrane cartridge for dehumidifying gases.

2. Description of the Related Art

Dehumidifying systems are used in a variety of different applications. For example, air dehumidifying systems are used in applications ranging from dehumidification of offices for maintaining comfortable working areas during summer months to providing dry air for dental tools. Different applications often require different levels of humidity. A humidity level of about 40% to 60% is comfortable in homes or offices, while a humidity level of less than 10% is desirable in certain laboratory situations. Even lower humidity levels are often desirable in communications systems.

Commonly used signal transmission media in communications systems are waveguide, coaxial cable, multiwire telephone cables, and optical fiber cables. Changing environmental conditions can affect the overall performance of a system using any of these media. For example, when the temperature of air inside a waveguide or other transmission medium falls below its dew point, condensation occurs inside the transmission line. Condensation lowers the efficiency of waveguide and coaxial cable systems partially because the dielectric constant of water is greater than the dielectric constant of air, and partially because the condensation alters the impedance of the waveguide or coaxial cable and may produce signal variation or loss. In multiwire cables, condensation can lower the insulation resistance and introduce undesirable leakage paths.

To prevent the accumulation of moisture in such systems, the transmission line is normally sealed and pressurized to prevent the ingress of moisture through any small gaps. To prevent condensation within the system, the pressurization is effected with dry air from a dehumidifier or dehydrator. A compressor or pump typically supplies the pressurized air, and the dehumidifying apparatus removes moisture from the pressurized air before it is injected into the system. The low moisture content of the air lowers the dew point so that condensation does not take place except at very low temperatures. Moreover, due to the small amount of moisture present in the injected air, only a small amount of condensate can form even at unusually low temperatures.

One type of dehumidifier is commonly referred to as a desiccant dryer. Typically, a desiccant container holds a hydroscopic agent, such as silica gel, calcium oxide or sulfuric acid, and a gas such as air is pumped through the container. Since the desiccant has a great affinity for water, moisture within the air is attracted to the desiccant. Therefore, gas leaving the container contains little moisture. However, the hydroscopic agent eventually becomes saturated or ineffective and requires regeneration or replacement. Due to this shortcoming, continual operation is impossible where only one desiccant container is used. Moreover, many of the hydroscopic agents, such as sulfuric acid, are hazardous and expensive.

Another type of dehumidifier is commonly referred to as a refrigerant dryer. Refrigerant dryers cool a compressed gas below the ambient temperature so that moisture in the compressed gas condenses on refrigerated coils. In contrast to desiccant dryers, refrigerant dryers have the advantage of being able to continually remove moisture from the gas. However, refrigerant dryers require large quantities of energy, and dehumidification of gases to low humidity levels is difficult.

Another type of dehumidifier, commonly referred to as an automatic pressure-sensing regenerative dryer, uses two cylindrical towers containing molecular sieve material. The two towers are alternately cycled so that while one chamber is drying the gas passing through it, the other chamber is being purged of accumulated moisture. These two towers vent to the atmosphere through a solenoid valve activated by a timing motor. This type of dryer is inherently noisy and requires a considerable number of electro-mechanical parts, which reduces the reliability of the system.

It has also been known that gases can be dried by passing them through a membrane cartridge containing multiple membranes through which moisture, but not the gas being dried, can permeate and escape to the atmosphere or a collection system. The membranes in such cartridges, which are commercially available, are typically in the form of hollow fibers so that a gas may be passed through the interiors of the fibers while moisture removed from the gas is collected from the exteriors of the fibers.

The present invention is directed to overcoming one or more of the problems as set forth above.

SUMMARY OF THE INVENTION

It is the primary object of the present invention to provide a dehumidifying system which uses a membrane filter to separate water vapor from a gas to be injected into a dry gas system, while controlling the dew point of the gas dehumidified by the membrane filter.

It is another objective of the present invention to provide such a dehumidifying system which controls both the pressure of the air introduced into the membrane filter and the flow rate of the gas through the membrane filter.

It is yet another object of the present invention to provide such a dehumidifying system which can be operated intermittently, and yet is capable of immediately furnishing dehumidified gas at the beginning of each cycle.

It is still another object of the present invention to provide such a dehumidifying system which uses less energy than comparable refrigerant dryers and which is easier to use and maintain than comparable desiccant dryers.

It is a further object of the present invention to provide such a dehumidifying system which is capable of furnishing gases with dew points below −40° F.

A still further object of the present invention is to provide such a dehumidifying system which is particularly suitable for supplying dehumidified air to a substantially closed pressurized system such as a waveguide system.

Other objects and advantages of the invention will become apparent upon reading the following detailed description and upon reference to the accompanying drawings.

In accordance with the present invention, the foregoing objectives are realized by providing a dehumidification system which passes the gas to be dehumidified through a membrane cartridge having membranes which remove water vapor from the gas, the membrane cartridge having an inlet for receiving the gas to be dehumidified, a first outlet for ejecting dehumidified gas from the membrane cartridge, and a second outlet for ejecting water vapor from the membrane cartridge; and controls the dew point of the dehumidified gas ejected from the membrane cartridge by regulating the flow rate at which the air is passed through the cartridge in accordance with a predetermined relationship between the dew point and the flow rate for the membrane cartridge. In a preferred embodiment, the pressure of the gas supplied to the membrane cartridge is regulated so as to maintain a substantially constant supply pressure at the inlet to said membrane cartridge.

Figure 1:
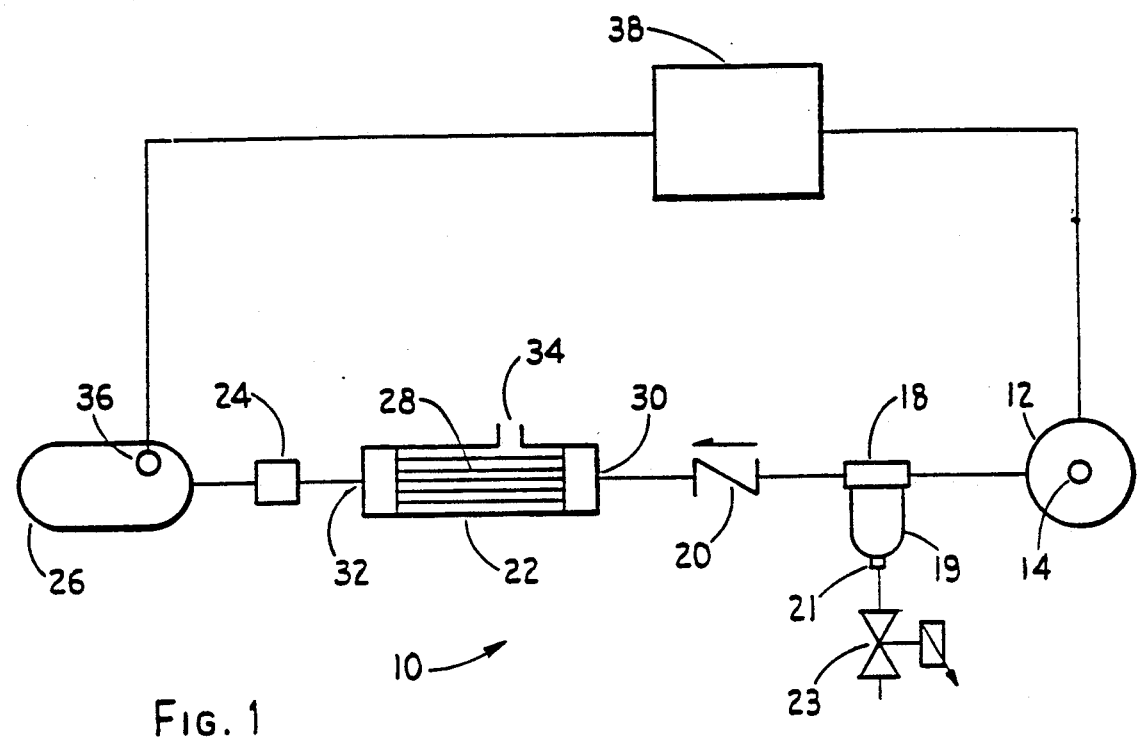
FIG. 1 is a diagrammatic illustration of a dehumidification system embodying the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Referring initially to FIG. 1, a dehumidification system is illustrated and generally designated by a reference numeral 10. This system will be described herein with specific reference to the dehumidification of air, but it will be understood that the system is generally applicable to the dehumidification of other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane.

An air compressor or pump 12 pressurizes air from the atmosphere which enters the compressor 12 through an inlet 14. The pressurized air delivered by the compressor 12 is routed through a liquid water filter 18, a pressure regulating valve 23 and a check valve 20 to a membrane cartridge 22. The membrane cartridge 22 removes moisture from the pressurized air and routes the dehumidified air through a flow control valve or orifice 24 to the inlet of a dry air system 26.

The membrane cartridge 22 utilizes hollow fiber membranes 28 to separate water vapor from air and expel it from the cartridge as water vapor. The hollow fiber membranes 28 allow certain gases to permeate through the fiber and escape, while other gases continue through the hollow portion of the fiber. The hollow fiber membranes 28 extend from a cartridge inlet 30 to a cartridge outlet 32 so that only air which travels within the hollows of the fibers 28 is available for induction into the dry air system 26. Gases, such as water vapor, which permeate through the walls of the fibers, exit the cartridge 22 through a weep hole 34.

The preferred membrane cartridge is commercially sold under the tradename "Prism Cactus" by Permea Inc., Malvern Industrial Park, Box 396, Malvern, Pa. 19355. Using this type of membrane cartridge, gases such as water vapor, hydrogen, helium and carbon dioxide permeate the fiber membrane quickly, while gases such as carbon monoxide, nitrogen and methane permeate the fiber membrane slowly. Therefore, the flow rate through the membrane cartridge is chosen so that unwanted gases, in this case water vapor, are filtered out. Since the time the various gases spend within the membrane cartridge determines which gases are expelled through the weep hole and which gases pass through to the outlet of the membrane cartridge, the flow rate depends upon the size and the length of the membrane cartridge. With a given flow rate, more gases, and greater quantities, are filtered out of air traveling through a long membrane cartridge than through a relatively short membrane cartridge because the gases spend more time inside the longer membrane cartridge. The preferred method and apparatus used to achieve a desired flow rate ar set forth below.

The compressed air from the compressor 12 flows into the liquid water filter 18 which removes liquid water from the air. The liquid water is removed from the air to prevent it from possibly saturating the fiber membranes within the membrane cartridge 22. Saturated fiber membranes cannot filter water vapor from the air, and thus removal of the liquid water prolongs the efficient operation of the membrane cartridge 22. The removed water drips into a bowl 19 and is expelled from the bowl 19 through an orifice 21. Preferably, the water is discharged onto hot portions of the compressor 12 so that the water evaporates. Using the compressor 12 to dispose of the water eliminates the need for a container which would catch the water and require frequent emptying.

To facilitate automatic control of the air flow rate through the membrane cartridge 22, the air that is introduced into the membrane cartridge 22 is supplied at a regulated constant pressure. A pressure-regulating valve 23, which is attached to the orifice 21 of the bowl 19, serves two purposes. First, the pressure-regulating valve 23 smooths out pressure fluctuations from the compressor 12 and eliminates varying pressure levels which result from the use of different compressors having different output pressures; a constant pressure into the membrane cartridge 22 allows it to consistently remove a preselected amount of moisture from the air, as will be discussed in greater detail below. Second, the excess pressure which is vented by the pressure regulating valve 23 is used to forcefully expel the water from the bowl 19.

If the compressor 12 produces an output pressure which varies from about 90 p.s.i. to about 100 p.s.i., then the pressure regulating valve 23 preferably regulates the output pressure to about 90 p.s.i. The regulated air then passes through a check valve 20 which allows air to pass from the compressor 12 to the membrane cartridge 22, but prevents air from flowing in the reverse direction, from the membrane cartridge 22 into the liquid water filter 18. Pressure regulation becomes most important when the dehumidifying system 10 is used to lower the moisture in the air to very low dew points, such as −40° F. and below.

The dew point of the dehumidified air discharged from the cartridge outlet 32 varies with the air flow rate. Consequently, by controlling the rate at which air passes through the cartridge, the dew point of the dehumidified air can be controlled within a relatively narrow range with a relatively simple control device, e.g., a simple flow control valve or orifice 24 located between the membrane cartridge and the space to which the dehumidified air is supplied.

Thus, if the system 10 is required to provide dehumidified air with a dew point of −10° F., for example the valve or orifice 24 restricts the flow of air through the membrane cartridge so that, for the worst case ambient conditions, the air remains in the membrane cartridge long enough to remove enough moisture from the air to lower its dew point to −10° F. For instance, the valve or orifice might be selected to produce a dew point of −10° F. at the prescribed pressure at the input to the cartridge 22 and at 100% relative humidity in the ambient air. Similarly, if the system 10 is required to provide the same amount of dehumidified air with a dew point of −40° F., then the valve or orifice 24 is selected to further restrict the flow of air through the membrane cartridge so that the air remains in the membrane cartridge for a longer period of time in order to remove enough moisture from the air to lower the dew point to −40° F.

If it is desired to have a variable flow rate for any given application, the flow rate permitted by the valve or orifice 24 may be regulated by an electrical control unit 38. For example, it might be desired to modulate the dew point of the dehumidified air according to the ambient temperature, in order to minimize the running time of the compressor 12.

Typically, both a constant pressure into the membrane cartridge and a constant flow rate through the membrane cartridge 22 are desirable in order to achieve a desired dew point in the dehumidified air. For instance, waveguide systems which operate in environments as cold as −40° F. require dehydrated air having a dew point of −40° F. or below to prevent condensation within the waveguide. Therefore, the supply pressure, the flow rate, and the size of the membrane cartridge are selected to supply a particular waveguide system with dehydrated air having the desired dew point.

Preferably, the system 26 is a tightly sealed system, such as a waveguide system (or other signal transmission media), so that the induction of the pressurized dehumidified air pressurizes the system 26. A pressurized system prevents humid atmospheric air from seeping into the system, thereby preserving the low humidity level of the air. Since the dehumidified air cannot rapidly escape from the sealed system 26, the compressor 12 does not need to operate continuously in order to effectively dehumidify the air contained within the system. Therefore, in order to optimize the efficiency of the dehumidifying system 10, the compressor 12 is operated intermittently. This intermittent operation may be cyclical, using a simple control which automatically switches the compressor 12 on and off at regular time intervals.

Alternatively, a pressure sensor 36 within the system 26 may be used to switch the compressor 12 on and off via the control 38. When the pressure level in the system 26 falls below a predetermined set point, the control 38 delivers an activating signal to the compressor 12 to initiate the flow of dehumidified air into the system 26. After the pressure level reaches an acceptable level, the control 38 delivers a deactivating signal to the compressor 12 in order to minimize the amount of energy used by the system 10. If the system 26 is a waveguide system, the compressor 12 is typically turned off when the pressure within the waveguide reaches about 8 p.s.i., and the compressor is turned on when the pressure falls below about 3 p.s.i. The lower setpoint of 3 p.s.i. insures that under extreme environmental conditions the waveguide system will not draw a vacuum which would bring in humid air from the atmosphere. A system of this type is described in detail in applicant's co-pending United States patent application Ser. No. 417,595 filed concurrently herewith.

Figure 2:
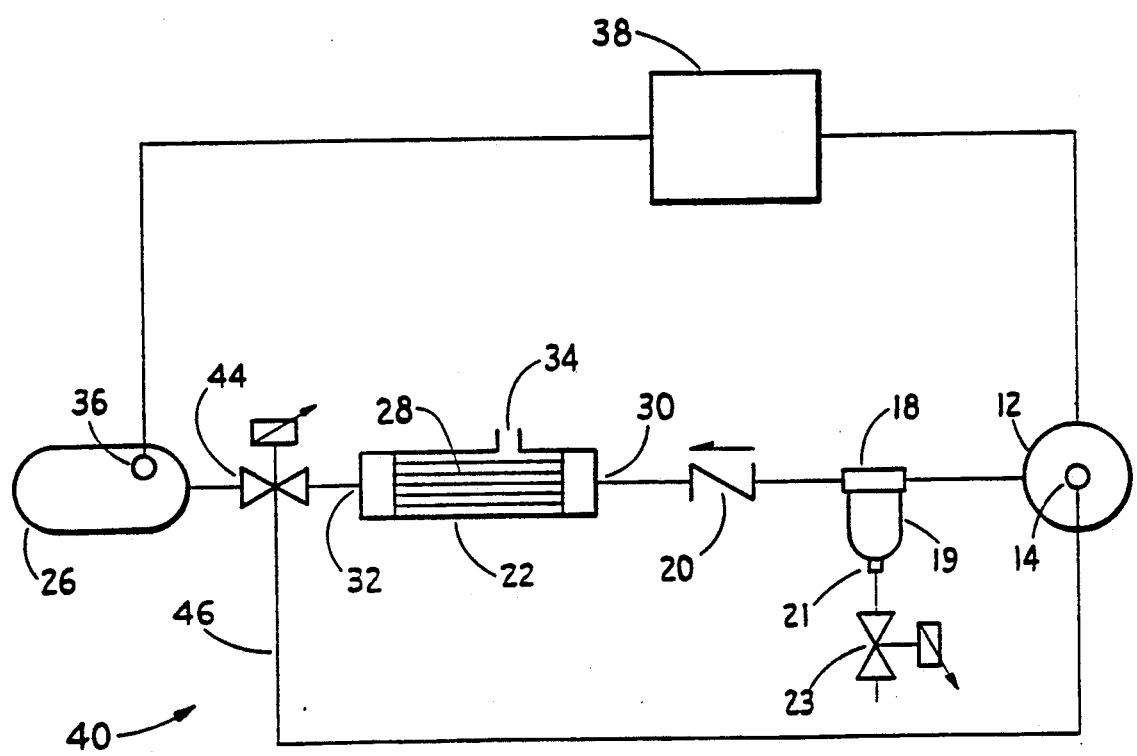
FIG. 2 is a diagrammatic illustration of a modified dehumidification system embodying the present invention.

An alternate method of controlling the flow rate of air through the membrane cartridge, and thus the dew point of the air, is illustrated by the system 40 in FIG. 2. In this system, the flow control valve or orifice 24 of the system 10 is replaced by a flow control/bypass valve 44 which is connected to the inlet 14 of the compressor 12 via line 46. A humidity sensor in the output line from the cartridge 22 controls the valve 44 to allow only air having a dew point below a preselected level to flow into the dry air system 26. Air which is not dry enough bypasses the dry air system 26 and returns to the inlet 14 of the compressor 12 via the line 46. The compressor 12 then reinjects the air into the membrane cartridge 16 where the air is further dried and delivered once again to the flow control/bypass valve 44. Using this device 44, the flow rate need not be precisely controlled because air which is too humid is simply recycled through the system 40 again. When the air reaches the desired humidity level, i.e., when the dew point is reduced to the desired level, the air is introduced into the dry air system 26. Instead of using a humidity sensor to control the valve 44, the valve 44 can simply be controlled by the unit 38 to supply air to either the dry air system 26 or the compressor 12. When the control unit 38 calls for pressurized air to be supplied to the dry air system 26, the valve 44 passes dehumidified air directly from the cartridge 22 to the dry air system 26, at a controlled rate. When the control unit 38 does not call for pressurized air to be supplied to the dry air system 26, the valve 44 is automatically switched to its bypass position for returning air from the output of the cartridge 22 to the compressor for recirculation through the cartridge. Then when the control unit 28 subsequently calls for pressurized air to be supplied to the dry air system 26 again, dry air is immediately available at the output of the cartridge.

Although the invention has been described with particular reference to controlling the dew point of air, the invention is also applicable to other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane. The cartridge 22 must be provided with different membrane and/or treatments for certain of these gases, as described for example in U.S. Pat. No. 4,230,463; 4,472,175; 4,486,202; 4,575,385; 4,597,777; 4,614,524; 4,654,055 and 4,728,345.

We claim:

1. A method of controlling the dew point of a gas which is dehumidified for introduction into a dry gas system, comprising the steps of passing the gas to be dehumidified through a membrane cartridge having membranes which remove water vapor from said gas, said membrane cartridge having an inlet for receiving the gas to be dehumidified, a first outlet for ejecting dehumidified gas from said membrane cartridge, and a second outlet for ejecting water vapor from said membrane cartridge; and controlling the dew point of the dehumidified gas ejected from said membrane cartridge by regulating the flow rate at which said gas is passed through said cartridge in accordance with a predetermined relationship between said dew point and said flow rate for said membrane cartridge.

2. The method of claim 1 wherein said flow rate is regulated by passing said gas through a flow control valve or orifice between said membrane cartridge and said dry gas system.

3. The method of claim 2 wherein said flow control valve restricts the flow of gas through said membrane cartridge to a preselected flow rate.

4. The method of claim 3 wherein said preselected flow rate is the rate at which said membrane cartridge removes a sufficient amount of water vapor from said gas to lower the dew point of said gas to a desired level.

5. The method of claim 1 which includes the step of regulating the pressure of the gas supplied to said membrane cartridge so as to maintain a substantially constant supply pressure at the inlet to said membrane cartridge.

6. The method of claim 5 wherein said gas pressure is regulated by passing the gas to be dehumidified through a compressor and a pressure-regulating valve before the gas enters said membrane cartridge.

7. The method of claim 1 wherein said first outlet of said membrane cartridge is sized to permit the maximum flow said membrane cartridge can handle while removing enough water vapor from the gas to attain the desired dew point.

8. Apparatus for controlling the dew point of a gas which is dehumidified for introduction into a dry gas system, comprising a membrane cartridge having membranes which remove water vapor from gas passing over said membranes, said membrane cartridge having an inlet for receiving the gas to be dehumidified, a first outlet for ejecting dehumidified gas from said membrane cartridge, and a second outlet for ejecting water vapor from said membrane cartridge;

means for introducing the gas to be dehumidified into the inlet of said membrane cartridge; and means for controlling the dew point of the dehumidified gas ejected from said membrane cartridge by regulating the flow rate at which said gas is passed through said cartridge in accordance with a predetermined relationship between said dew point and said flow rate for said membrane cartridge.

9. The apparatus of claim 8 which includes means for regulating the pressure of the gas supplied to said membrane cartridge so as to maintain a substantially constant supply pressure at the inlet to said membrane cartridge.

10. The apparatus of claim 9 wherein said gas-introducing means includes a compressor which delivers pressurized gas to said membrane cartridge.

11. The apparatus of claim 9 wherein said controlling means comprises a flow control valve o orifice connected between said membrane cartridge and said dry gas system.

12. The apparatus of claim 11 wherein said flow control valve or orifice restricts the flow of gas through said membrane cartridge to a preselected flow rate.

13. The apparatus of claim 11 wherein said preselected flow rate is the rate at which said membrane cartridge removes a preselected amount of water vapor from said gas to lower the dew point of said gas to a preselected dew point.

14. The apparatus of claim 9 wherein said first outlet of said membrane cartridge is sized to permit the maximum flow rate said membrane cartridge can handle while removing enough water vapor from the gas to attain the maximum desired dew point under the worst operating conditions.

* * * * *